Patented Mar. 24, 1931

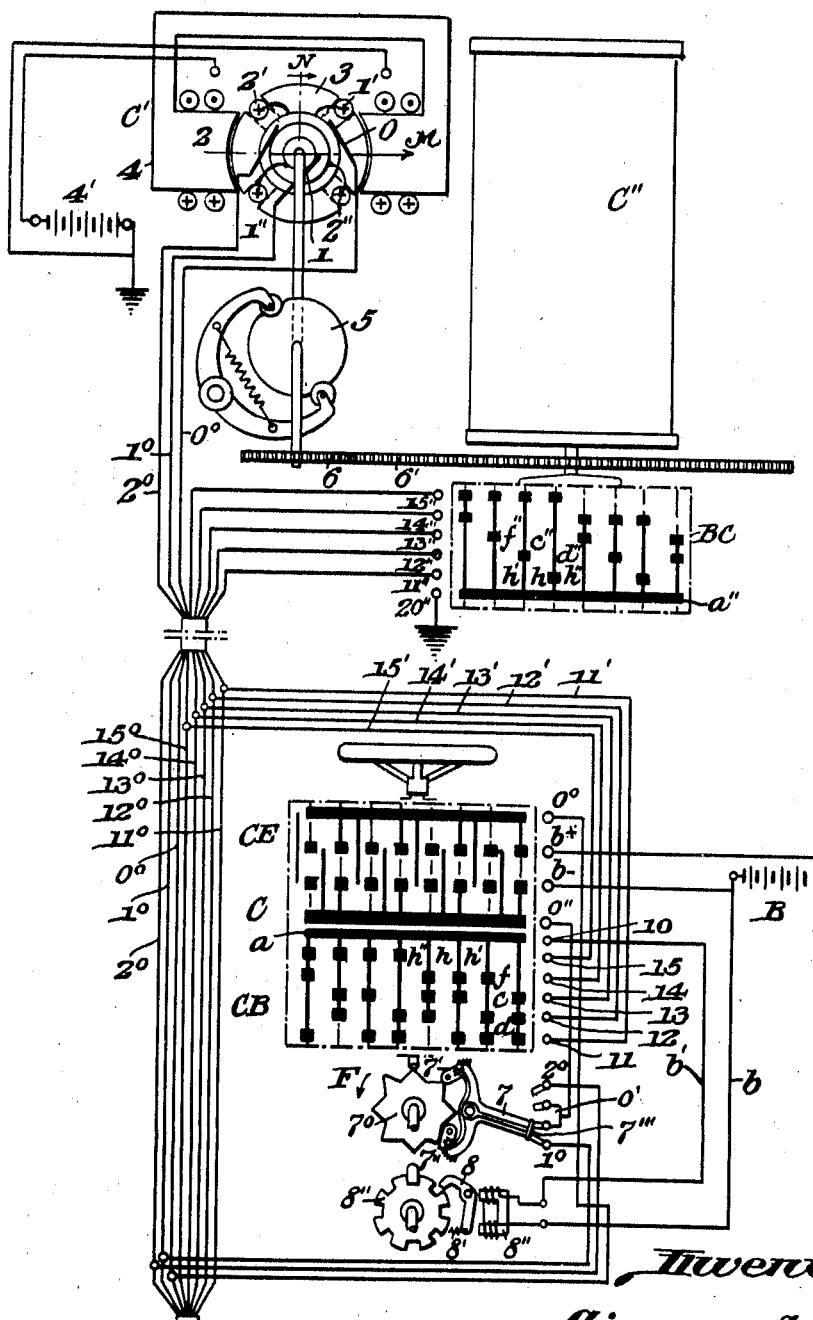

1,798,044

UNITED STATES PATENT OFFICE

GIACOMO SOMAJNI, OF MILAN, ITALY

REMOTE CONTROL APPARATUS

Application filed August 10, 1928, Serial No. 298,740, and in Italy September 19, 1927.

This invention relates to remote control apparatus, and more particularly to remote control apparatus of the socalled telemotor kind, in which apparatus at a controlled station or stations is required to follow up the movements of apparatus at the control station.

There are many known arrangements for the the remote control of devices which are required, for various purposes, to be arranged in different positions; for example, for many controllers controlling the motors of a plurality of automotive coaches which constitute a remote controlled train.

Certain known arrangements of this kind utilize electromagnetic interrupters, while others employ pilot electric motors started and braked by current impulses sent from a central station. The latter arrangements are mechanically more robust, but their operation is apt to be somewhat uncertain unless the control gear be made unduly complicated.

The present invention has for its principal object to provide an arrangement comparable in robustness with pilot motor arrangements, but which is as simple and as accurate in operation as those employing electromagnetic interrupters.

The invention envisages the employment of a control device, and means whereby, in the different positions of this device, currents are caused to flow in the control circuits, the said currents causing mechanical movement in the controlled devices in either direction.

The invention further envisages the provision of means for preventing further movement of the control device until all the devices controlled thereby have moved to positions corresponding to that of the said control device.

In carrying out the present invention, there are employed a plurality of double electromagnetic devices, each of which is adapted to advance a controlled device driven thereby one step in the same direction, for successive current impulses of alternately reversed polarity supplied thereto. The two members of the duplex electromagnetic devices drive the same controlled device and are so arranged that one causes step-by-step movements in one direction, while the other serves for the opposite direction. The controlling station, which provides the current impulses, comprises means for producing a reversal of current for each step of movement of the control device in a given direction, while if its direction of movement be reversed, the operative connections to one electromagnetic device are broken, and those to the other are established.

The control device is associated with a locking arrangement which leaves the said device free to be moved only after all the local controlled devices have completed a required, previously-communicated movement.

In all known multiple-control systems for electric trains, the control stations are usually located at each end of each car, so that the operation of the train can be controlled by an operator at the front of the train, regardless of the make-up and direction of travel of the train. It is obvious that in the present improved system, it is readily possible to adopt an analogous arrangement by multiplying the central control stations, just as it is necessary to multiply the local control stations, the several central stations and the several local stations being identical, respectively, with the single central station and single local station illustrated.

The accompanying drawing is a diagrammatic view showing one construction, according to the invention, for controlling apparatus or devices located at a plurality of different stations from a single controlling station.

Referring to the drawing C" shows one controlled apparatus or device which is, for example, a drum controller or similar implement, C' indicates the driving means or device for rotating controller C" in one or the other direction, and 5 represents a device for adusting and stopping the rotation of the driving device C'. Several lines connect the controlled or distant stations with the central station, shown in the lower part of drawing, which latter station comprises a central controller C for actuating the drums C" or the like at the controlled stations, and a switching device F adapted to rotate with controller C and to cause the current inversions for producing a reverse movement of the drums C", as will be described hereinafter. A locking device 8° is also located at the central station, the pawl 8 of which is actuated by a spring 8' and by the battery B.

The arrangement is such that even if an impulse is sent from the central controller C for a long period, only one step is taken by the driving device C', it being necessary to send a further impulse of opposite polarity to obtain a further step in the same direction. This advantageous result is, moreover, obtained without the use of brakes.

The driving means or device C' comprises a rotating armature 3, provided with two windings 1'—1", and 2'—2", arranged in the magnetic field M of a permanent or an independently excited electromagnet 4. In the drawing, the magnet is shown as a bipolar electromagnet fed from an auxiliary battery 4'. The windings 1'—1", 2'—2" have one end connected to a common slip ring 0, the other ends being respectively connected each to one of two rings 1, 2. Brushes bearing upon the slip rings are connected by means of three lines 0°—1°—2° to the central control apparatus, as will be later described.

The windings 1'—1" and 2'—2" are so arranged as to lie near the geometrical axial plane of the armature passing through the pole tip of the magnet 4 when the armature is in a position of rest.

Obviously, if desired, a multi-polar inductor may be employed, in which case each step of movement of the active conductors will be a fraction of 180°, instead of 180°, as is the case in the arrangement illustrated; and is it also obviously possible to employ a number of couples of windings equal to the number of pairs of poles.

If the central battery B, provided at the central or control station, be connected in the circuit of the brush 1 (the brush 2 being excluded from this circuit), current will traverse the winding 1'—1", the winding 2'—2" remaining inactive. If the said current enters at 1' and leaves at 1", then, owing to the direction of the magnetic field M, the winding 1'—1" will tend to turn in the direction of the arrow N until it reaches the neutral vertical plane. It will then continue its rotation at a lower speed, under the influence of the kinetic energy of the rotating parts, until it has moved through 180° when it will be stopped and held accurately in a definite position by a centering wheel 5, keyed to the armature shaft. The operation of the wheel 5 will be obvious from the drawing, whence it will be seen that the said wheel, while serving to give accurate location, yet leaves sufficient play to ensure reliable operation.

It will be seen that even if the current fed to the winding 1'—1" continues after the required movement has occurred, the armature will remain stationary since the negative couple is too weak to cause reversed movements.

The mechanism to be controlled (for instance, the drum controller C") is driven by the armature 3 by means of a pair of toothed wheels 6—6' (or other equivalent means).

If, after the above described step of movement has occurred, a current of opposite polarity is sent from the control station, this current will traverse the winding 1'—1" and thus cause the armature 3 to take another step forward and so on, each successive reversal of impulsing current causing a further step in the same direction, until the limit of movement is reached.

If, at any given moment, it is required to cause the device C' to operate in the other direction, it is merely necessary to disconnect the battery B at the control station from the circuit of the brush 1, and connect it in circuit with the brush 2. The winding 2'—2", which functions in a manner similar to that described in connection with winding 1'—1", except that it rotates in the opposite direction, is thus put into action.

The control station comprises means for producing the required reversals of current, and also means for effectively connecting the winding 1'—1" or 2'—2" in circuit with the battery B, according to the direction of rotation required.

The current-reversing means comprise a commutator or drum C E, having two series of contacts adapted to make contact in each position with fixed contact members $b+$ and $b-$, connected to the battery B. The arrangement is such that the sets of contacts are alternately connected to two conducting bars 0° and 0", bar 0° being permanently connected through the correspondingly indicated wire to the brush 0, while the bar 0" is adapted to be connected, as will be described later, to one of the two conductors 1°—2° connected respectively to the brushes 1—2. Thus, at each step of the control device C, consequently of the drum C E, the current in the winding 1'—1" or 2'—2", connected to the battery B, will be reversed.

The means for connecting and disconnecting the windings 1'—1", 2'—2" comprise a star wheel 7° on the shaft of the central controller C and cooperating with a pivoted balance arm 7, having a conductive bridge piece 7''', and a pair of spring pawls 7', 7", which are hinged, as shown, and spring biased towards positions with respect to the wheel 7°. Assuming the parts to be occupying the positions shown, it will be seen that if the wheel 7° turns in the direction of the arrow F, the pawl 7' will not oppose its movement, since the said pawl is out of the field of engagement, while the pawl 7" will not oppose movement because it is folded back.

If, now, the direction of rotation is reversed, the pawl 7" will engage the advancing face of the adjacent point or tooth of the wheel 7° thus causing the arm 7 to pivot and moving the bridge 7"' from a position connecting contacts 0' and 1° to a position in which contacts 0' and 2° are bridged, thus effectively disconnecting winding 1'—1" and connecting winding 2'—2". Further, rotation of the device C in the same direction is, of course, unimpeded by the arm and pawls, since the pawl 7" will be carried out of engagement and the pawl 7' folded back. Further, reversal of device C will obviously bring the arm 7 back to the illustrated position.

A centering device (not shown), which may be of any convenient known form, is provided for accurately centering the arm 7 in its two positions.

The apparatus also comprises a locking device which prevents any further movement of the central controller C until driving device C' has made a required movement. This locking device, in the construction illustrated, is constituted by a ratchet wheel 8°, keyed to the shaft of the controller C and cooperating with a pawl 8 normally retained in the open position by a spring 8' and adapted to be attracted to the locking position by an electromagnet 8" which is energized from the battery B each time a special circuit, controlled by all the local controlled devices (of which there is one at each controlled station) is closed. Such closure is effected so long as there is a local controlled device C" which has not reached the position corresponding to that of the central control device C.

There are many different ways for controlling the energizing of magnet 8" and, consequently, the operation of pawl 8.

In the simple form illustrated, the locking circuit includes a plurality (say $x$) of main connecting lines $11^0$, $12^0$, $13^0$ ... which terminate at each controlled station in brushes BC 11", 12", 13" ... ; said circuit also including the lines 11', 12', 13' ... which terminate at one end at the central station in the brushes CB 11, 12, 13 ... and, at the other end, are connected to said main connecting lines.

The brushes BC 11", 12", 13" ... are associated at each station C" with contacts arranged on a drum BC, which is rigidly connected to the shaft of the drum C", while the brushes CB 11, 12, 13 ... at the central station are arranged to cooperate with contacts in another drum CB, which is similarly connected to the shaft of the central controller C.

The arrangements of the different drum contacts are suitably determined so as to permit the closing of the magnet circuit at the proper time and, consequently, the engagement of the locking pawl 8 with ratchet 8°.

Supposing, now, that the control drum CB has previously been rotated into the intermediate position indicated at $h$, the arrangement must be such that the sets of contacts allow the rotation of the hand-wheel of control drum CE if the controlled drums BC have all reached the corresponding position $h$, and to lock it if the drums have not yet attained said required position $h$.

At the central station, the battery B is connected to ground at one end and, at the other end, is connected by line $b$ with a terminal of the magnet 8". The other terminal of said magnet is connected over the line $b'$ with the brush 10 which slides over a bar $a$ situated on the main drum CB; said bar $a$ being connected with a plurality of contacts that cooperate with a number of brushes or contacting members 11, 12, 13 ... For each position of the drum CB, the brush 10 is permanently connected through the bar $a$ with all the contacts and, therefore, with one or another of the brushes 11, 12, 13 ... connected by the lines 11', 12', 13' ... to the main lines $11^0$, $12^0$, $13^0$; the latter lines being connected at each controlled station to the corresponding brushes 11", 12", 13" ... Similar series of contacts are also provided at the controlled stations, where they are mounted on drums BC, to engage said brushes 11", 12", 13" ... , and are connected to bars $a''$ which always communicate with ground through contact members 20".

If, now, for a given position of the hand-wheel of drum CB, the contact members (11 and 12 for example) engage their associated contacts $d$ and $c$, respectively, a circuit will be closed every time that the corresponding brush at BC 11" or 12" engages contacts $d''$ and $c''$. Stated otherwise, suppose that all the controllers C" are in the position $h$ corresponding to the one occupied by the central controller C; when, the locking device being open, the hand-wheel of controller C is rotated, for example to position $h'$, a circuit is closed as follows: the grounded battery B, line $b$, magnet 8", line $b'$, brush 10 which slides along contact bar $a$, contacts $f$, $c$ and $d$ which coact with brushes 14, 12 and 11, lines 14', 12' and 11', respectively, and main lines $14^0$, $12^0$ and $11^0$, respectively, to the brushes 14", 12" and 11" at the controlled station drum BC. The latter, being in the position $h$ previously attained, closes a circuit through contact $c'''$, brush 12", bar $a''$ and grounded contact 20". The current thereupon energizes the magnet 8" which attracts its armature, thus locking ratchet 8° and, hence, the drum shaft to prevent it from rotating. But the rotation has caused armature 3 at the controlled station to be traversed by a current impulse which operates drum C" in the manner previously described.

The drums C" are thus turned one step in the required direction, and now each contact f'' of drums BC will reach its brush. The circuit is closed through: grounded battery B, line b, magnet 8'', line b', brush 10, bar a, the contacts of drum CB at the position designated h', i. e. f, c and d, brushes 14, 12 and 11, respectively, lines 14', 12' and 11', main lines 14°, 12° and 11°, and the respective brushes 14'', 12'' and 11'' at drum BC. The circuit remains open and thus frees the hand-wheel of the central controller C. But if, however, any of the controlled drums should stop in position h, the contact c'' will remain engaged with the brush 12'', closing the circuit through the bar 20'' which is grounded. In this case, the locking device is operated to prevent any rotation.

It will be seen that, in the same manner, the locking device will act if any controlled station, instead of rotating in the required direction, rotates in the opposite direction, causing a step in position h'', which does not correspond properly with the control drum position. In that event, the contact d'' at the controlled station will close a circuit through brush 11'', the bar a'' and the ground. No movement of the hand wheel of the central drum is possible because the ratchet 8° is locked by the pawl 8. Thus, every time that the drum at the control station is moved forward or backward, locking is effected as soon as one step is taken, on account of the combination of contacts, such locking being eliminated only when the drums of the controlled devices have themselves also completed one step in the required direction.

This arrangement would necessitate, however, the employment of a number of conductors equal to that of the positions necessary, if it were not desired to allow of periodic repetitions, in order to avoid the possibility of correspondence between positions which are actually different. With the same number ($x$) of lines, it is possible, however, to obtain a greater number of combinations of connections. Thus, there may be arranged in the various rows of drum contacts, with relation to the devices controlled (each of which comprises $x$ contacts) not merely a single but several contacts $y$, and to provide $x-y$ contacts arranged in complementary positions upon the drum of the control station.

Thus, with five conductors, for example, there will be ten possible different combinations, capable of characterizing ten completely different positions and, in general, a number of positions equal to that of the combinations of $x$ elements taken $y.x$.

Obviously, the locking operation can be effected when the circuit to the magnet 8'' is de-energized, as when it is energized, the changes necessary in the control circuits and in the mechanical arrangement of the ratchet being obvious to those skilled in the art.

The regulation of the locking circuit may be effected in many different ways, according to the construction of the driving device C' and to other conditions, in any given case.

Having now particularly described and ascertained the nature of my said invention and in what manner the same is to be performed, I declare that what I claim is:

1. In a remote control apparatus embodying a controlling station and a controlled station, the combination of a double electromechanical device located at the controlled station and adapted to advance step by step in one direction when one of its elements is energized by impulses of alternately-reversed polarity, and in the opposite direction when its other element is similarly energized; and, at the controlling station, a controlling member movable step by step, means for producing impulses of alternately-reversed polarity for each successive step of the controlling member in a given direction, and means for feeding said impulses to one or the other element of the double electromechanical device at the controlled station according as said controlling member is moved in one or the other direction.

2. A remote control apparatus, according to claim 1, in which means are provided for preventing further movement of the controlling member located at the controlling station until the double electromechanical device located at the controlled station has completed a predetermined movement.

3. A remote control apparatus, according to claim 1, in which the double electromechanical device at the controlled station comprises a rotatable armature arranged in a substantially-constant magnetic field and provided with two separate windings symmetrically arranged with respect to a neutral line, a slip ring common to both windings and to which the same are connected at one end, and a pair of slip rings to which said windings are connected at the other end; a source of current; and a switch device located at the controlling station and to which all three rings are connected; said switch adapted to be moved to connect one or another of the windings to said current source according to the required direction of rotation of said armature.

4. A remote control apparatus, according to claim 1, in which the double electromechanical device at the controlled station comprises a rotatable armature arranged in a substantially-constant magnetic field and provided with two separate windings symmetrically arranged with respect to a neutral line, a slip ring common to both windings and to which the same are connected at one end, and a pair of slip rings to which said windings are connected at the other end; a source of current; and a switch device located at the controlling station and to which all three rings are connected; said switch adapted to be moved to connect one or another of the windings to said current source according to the required direction of rotation of said armature; the windings being so arranged as to lie near the geometrical axial plane of the armature passing through the pole-tip of the electromechanical device when the armature is in a position of rest.

5. A remote control apparatus, according to claim 1, in which the double electromechanical device at the controlled station comprises a rotatable armature arranged in a substantially-constant magnetic field and provided with two separate windings, symmetrically arranged with respect to a neutral line, a slip ring common to both windings and to which the same are connected at one end, and a pair of slip rings to which said windings are connected at the other end; a source of current; a switch device located at the controlling station and to which all three rings are connected; said switch adapted to be moved to connect one or another of the windings to said current source according to the required direction of rotation of said armature, and the active conductors comprised in the windings being arranged to lie in proximity to the pole pieces of the electromechanical device when the armature is in a position of rest; and a centering device for accurately determining the rest positions.

6. In a remote control apparatus embodying a controlling station and a controlled station, the combination of a double electromechanical device located at the controlled station and adapted to advance step by step in one direction when one of its elements is energized by impulses of alternately-reverse polarity, and in the opposite direction when its other element is similarly energized; and, at the controlling station, a controlling member movable step by step, a reversing switch driven by said member for producing impulses of alternately-reversed polarity, and means for feeding said impulses to one or the other element of the double electromechanical device at the controlling station according as said controlling member is moved in one or the other direction.

7. A remote control apparatus, according to claim 6, in which the reversing switch includes a pair of conductor bars connected, respectively, to a common terminal of the switch and to a common collector ring of the armature of the electromechanical device, a local battery for emitting the impulses, and two sets of contacts adapted to be connected alternately to said bars and to the two terminals of the local battery.

8. A remote control apparatus, according to claim 1, in which the double electromechanical device at the controlled station comprises a rotatable armature arranged in a substantially-constant magnetic field and provided with two separate windings symmetrically arranged with respect to a neutral line, a slip ring common to both windings and to which the same are connected at one end, and a pair of slip rings to which said windings are connected at the other end; a source of current; and a switch device for connecting one or another winding to said current source located at the controlling station and to which all three rings are connected; said switch comprising a balance arm provided with pivotally-mounted pawls, a toothed wheel keyed to the shaft of the controlling member and with which said pawls coact, means for rocking said arm each time the direction of movement of the controlling member is reversed, and a switch member carried by the said arm for making the desired changes in connections.

9. In a remote control apparatus embodying controlling and controlled stations, a stepwise-rotary controlling device at the controlled station; a stepwise-rotary controlling device at the controlling station; electrical connections between the two devices for causing their operation in synchronism; and a switch operatively associated with the controlling device at the controlling station for producing impulses of alternately-reversed polarity for each successive step of the last-named controlling device in a given direction; said switch including a balance arm provided with pivotally-mounted pawls, a toothed wheel keyed to the shaft of the last-named controlling device and with which said pawls coact, means for rocking said arm each time the direction of movement of the controlling member is reversed, and a switch member carried by the said arm for making the desired changes in connections.

10. In a remote control apparatus embodying controlling and controlled stations, a stepwise-rotary controlling device at the controlled station; a stepwise-rotary controlling device at the controlling station; electrical connections between the two devices for causing their operation in synchronism; a switch operatively associated with the controlling device at the controlling station for producing impulses of alternately-reversed polarity for each successive step of the last-named controlling device in a given direction; and an electromagnetic device associated with said last named controlling device for locking it against rotation until the other controlling device has reached a corresponding position.

11. A remote control device according to claim 10, in which the electromagnetic locking device comprises a ratchet fixed to the shaft of the controlling device at the controlling station, a pawl cooperative with said ratchet, and a magnet influenced by the said controlling device at the controlling station for operating said pawl.

In testimony whereof I affix my signature.

GIACOMO SOMAJNI.